United States Patent
Shirota et al.

(10) Patent No.: US 7,729,306 B2
(45) Date of Patent: Jun. 1, 2010

(54) METHOD AND APPARATUS FOR PROVIDING A SERVICE THRESHOLD INDICATOR IN A WIRELESS COMMUNICATION SYSTEM

(75) Inventors: Masakazu Shirota, Yokohamashi (JP); Raymond Tah-Sheng Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 567 days.

(21) Appl. No.: 10/830,770

(22) Filed: Apr. 22, 2004

(65) Prior Publication Data

US 2005/0018633 A1  Jan. 27, 2005

Related U.S. Application Data (63) Continuation-in-part of application No. 10/628,030, filed on Jul. 24, 2003, now abandoned.

(60) Provisional application No. 60/514,352, filed on Oct. 24, 2003.

(51) Int. Cl.
| H04L 12/28 | (2006.01) |
| H04J 3/16 | (2006.01) |
| H04Q 7/00 | (2006.01) |
| H04W 36/00 | (2009.01) |
| H04W 72/00 | (2009.01) |

(52) U.S. Cl. .................. 370/329; 370/395.21; 370/468; 370/254; 465/436; 465/452.2

(58) Field of Classification Search ................. 370/252, 370/329, 332, 431, 462, 254, 341, 468, 395.21, 370/338, 336, 389, 352
See application file for complete search history.

(56) References Cited

U.S. PATENT DOCUMENTS 5,671,218 A * 9/1997 I et al. ................. 370/252

(Continued)

FOREIGN PATENT DOCUMENTS

GB  2379358 A * 3/2003

(Continued)

OTHER PUBLICATIONS

International Preliminary Examination Report PCT/US04/021615, International Search Authority European Patent Office Dec. 9, 2004.

(Continued)

*Primary Examiner*—Hanh Nguyen
(74) *Attorney, Agent, or Firm*—George J. Oehling; John J. Ketchum (57) ABSTRACT

A method and apparatus for a wireless communication system having a plurality of terminals is provided. At least one quality requirement defining a minimum quality of communication service threshold for receiving information by at least one terminal over a communication channel is determined. At least one quality parameter of the communication channel is also determined, where the quality parameter defines a degree of quality in which communication is received by the terminal over the communication channel. The quality parameter is compared to the quality requirement, and the terminal is prevented from tuning to the communication channel providing that the quality parameter is lower than the quality requirement. In another embodiment, the at least one quality requirement is associated with a service threshold indicator (STI) value, and the STI value is communicated to the terminal for comparison of the quality requirement to the quality parameter.

34 Claims, 6 Drawing Sheets

U.S. PATENT DOCUMENTS

| | | | |
|---|---|---|---|
| 6,073,235 A * | 6/2000 | Foladare et al. | 713/163 |
| 6,163,577 A * | 12/2000 | Ekudden et al. | 375/242 |
| 6,167,282 A | 12/2000 | Hunsberger | |
| 6,360,076 B1 | 3/2002 | Segura et al. | 455/67.1 |
| 6,728,215 B1 * | 4/2004 | Alperovich et al. | 370/252 |
| 6,834,193 B1 * | 12/2004 | Linderborg et al. | 455/450 |
| 7,024,162 B2 * | 4/2006 | Muthuswamy et al. | 455/67.11 |
| 7,194,622 B1 * | 3/2007 | Halasz et al. | 713/163 |
| 2001/0053139 A1 * | 12/2001 | Zimmermann et al. | 370/332 |
| 2002/0071405 A1 | 6/2002 | Kelley et al. | 370/332 |

FOREIGN PATENT DOCUMENTS

| | | |
|---|---|---|
| WO | 98031177 | 7/1998 |
| WO | WO 02043275 | 5/2002 |
| WO | 02080449 | 10/2002 |
| WO | WO 02/080449 A1 * | 10/2002 |
| WO | 03021886 | 3/2003 |

OTHER PUBLICATIONS

International Preliminary Examination Report PCT/US04/021615, Intemation Preliminary Exam Authority, United States Dec. 28, 2005.

Written Opinion, PCT/US04/021615, International Search Authority European Patent Office Jan. 24, 2006.

* cited by examiner

| BCMCS Flow ID 1 | Service Threshold Indicator (STI) for BCMCS Flow ID 1 | BCMCS Flow ID 2 | Service Threshold Indicator (STI) for BCMCS Flow ID 2 |

METHOD AND APPARATUS FOR PROVIDING A SERVICE THRESHOLD INDICATOR IN A WIRELESS COMMUNICATION SYSTEM

CLAIM OF PRIORITY UNDER 35 U.S.C. §119

The present Application for Patent claims priority to Provisional Application No. 60/514,352 entitled "Method and Apparatus for Providing a Service Threshold Indicator in a Wireless Communication System" filed Oct. 24, 2003, and assigned to the assignee hereof and hereby expressly incorporated by reference herein.

Claim of Priority under 35 U.S.C. §120

The present Application for Patent is a Continuation in Part and claims priority to patent application Ser. No. 10/628,030 entitled "Method and Apparatus for Providing a Service Threshold Indicator in a Wireless Communication System" filed Jul. 24, 2003 now abandoned, and assigned to the assignee hereof and hereby expressly incorporated by reference herein.

BACKGROUND

1. Field

The present invention relates generally to communication systems, and, more specifically, to a method and apparatus for providing a service threshold indicator in a wireless communication system employing a broadcast and multicast communication service (BCMCS).

2. Background

Broadcast and multicast services provide point-to-multipoint communication service in a wireless communication system between at least one base transceiver site and a plurality of access terminals that receive the broadcast data within the communication coverage area of the base transceiver site. The broadcast data (i.e., content) transmitted by the base transceiver site to the plurality of access terminals may include, but need not necessarily be limited to, news, movies, sporting events, and the like. The content is typically generated by a content server and is broadcast to the access terminals that subscribe to the service over a forward broadcast shared channel (F-BSCH).

To authenticate the access terminal for receiving the particular content subscribed to, a Broadcast Access Key (BAK) is usually used. The BAK serves as a security association between the content server and the group of access terminals that subscribe to certain services provided by the content server. Typically, a system operator of the wireless communication system will charge the access terminal's user upon obtaining the BAK. If the BAK has a relatively short lifetime (e.g., a few minutes), the access terminal will typically tune to the content on the F-BSCH subsequent to receiving the BAK. In some cases, however, the access terminal may move to a coverage area of the wireless communication system where the radio reception of the access terminal is poor for receiving the content albeit the access terminal may have successfully obtained the BAK over a TCP/IP session. As a result, the access terminal may experience an unacceptable service quality for receiving the content when the access terminal has tuned to the F-BSCH.

In another scenario, the lifetime of the BAK may be longer (e.g., for a month or more) to provide the access terminal with content received from the content server. As long as the BAK is obtained, the access terminal may receive the content over the F-BSCH. Although the access terminal may obtain the content over the F-BSCH, however, the content may become corrupted when the radio reception for the access terminal is deemed poor. As a result, the access terminal may try to decode the corrupted content, thus causing an unnecessary drain on the access terminal's battery.

In yet another scenario, the content may be delivered to a group of access terminals that may "playback" the content at a later time. If an access terminal resides in an area with poor radio reception of the wireless communication system, the received content may become corrupted when being received over the F-BSCH. The access terminal may subsequently request retransmission of the corrupted content at a later time. In such a case, a unicast (i.e., point-to-point) transmission of the content will serve to retransmit the particular content that was not properly received by the access terminal initially. However, if the number of access terminals that desire retransmission of the particular content becomes large, such unicast transmission may undesirably increase the load of the wireless communication system, thereby consuming the system's available resources significantly.

The present invention is directed to overcoming, or at least reducing the effects of, one or more problems indicated above.

SUMMARY

In accordance with one embodiment of the present invention, a method for a wireless communication system is provided. The method includes receiving a value for at least one quality requirement defining a minimum quality of communication service threshold for receiving information by at least one terminal over a communication channel. A value for at least one quality parameter of the communication channel is determined, the value of the quality parameter defining a degree of quality with which information can be received by the terminal over the communication channel. The terminal is prevented from tuning to the communication channel if the value of the quality parameter is lower than the value of the quality requirement.

In accordance with another embodiment, a method for a wireless communication system is provided. The method includes communicating a service threshold indicator (STI) value to at least one terminal, the STI value being indicative of at least one quality requirement defining a minimum quality of service threshold for receiving information by the at least one terminal over a communication channel. At least one quality parameter of the communication channel is measured, the quality parameter defining a degree of quality in which communication is received by the terminal over the communication channel. The terminal is prevented from tuning to the communication channel providing that the quality parameter is lower than the quality requirement.

In accordance with another embodiment, an apparatus is provided. The apparatus includes a receiver for receiving a value for at least one quality requirement defining a minimum quality of communication service threshold for receiving broadcast information by at least one terminal over a communication channel. A controller is provided for determining a value for at least one quality parameter of the communication channel, the value of the quality parameter defining a degree of quality with which information can be received by the terminal over the communication channel. The controller compares the value of the quality parameter to the value of the quality requirement and prevents the terminal from tuning to the communication channel if the value of the quality parameter is lower than the value of the quality requirement.

In accordance with another embodiment, an apparatus is provided. The apparatus includes a receiver for receiving a service threshold indicator (STI) value, the STI value being indicative of at least one quality requirement defining a minimum quality of service threshold for receiving information over a communication channel. The apparatus further includes an analyzer for measuring at least one quality parameter of the communication channel, the quality parameter defining a degree of quality in which communication is received by the receiver over the communication channel. A controller is also provided for preventing the receiver from tuning to the communication channel providing that the quality parameter is lower than the quality requirement.

DETAILED DESCRIPTION

Figure 1:
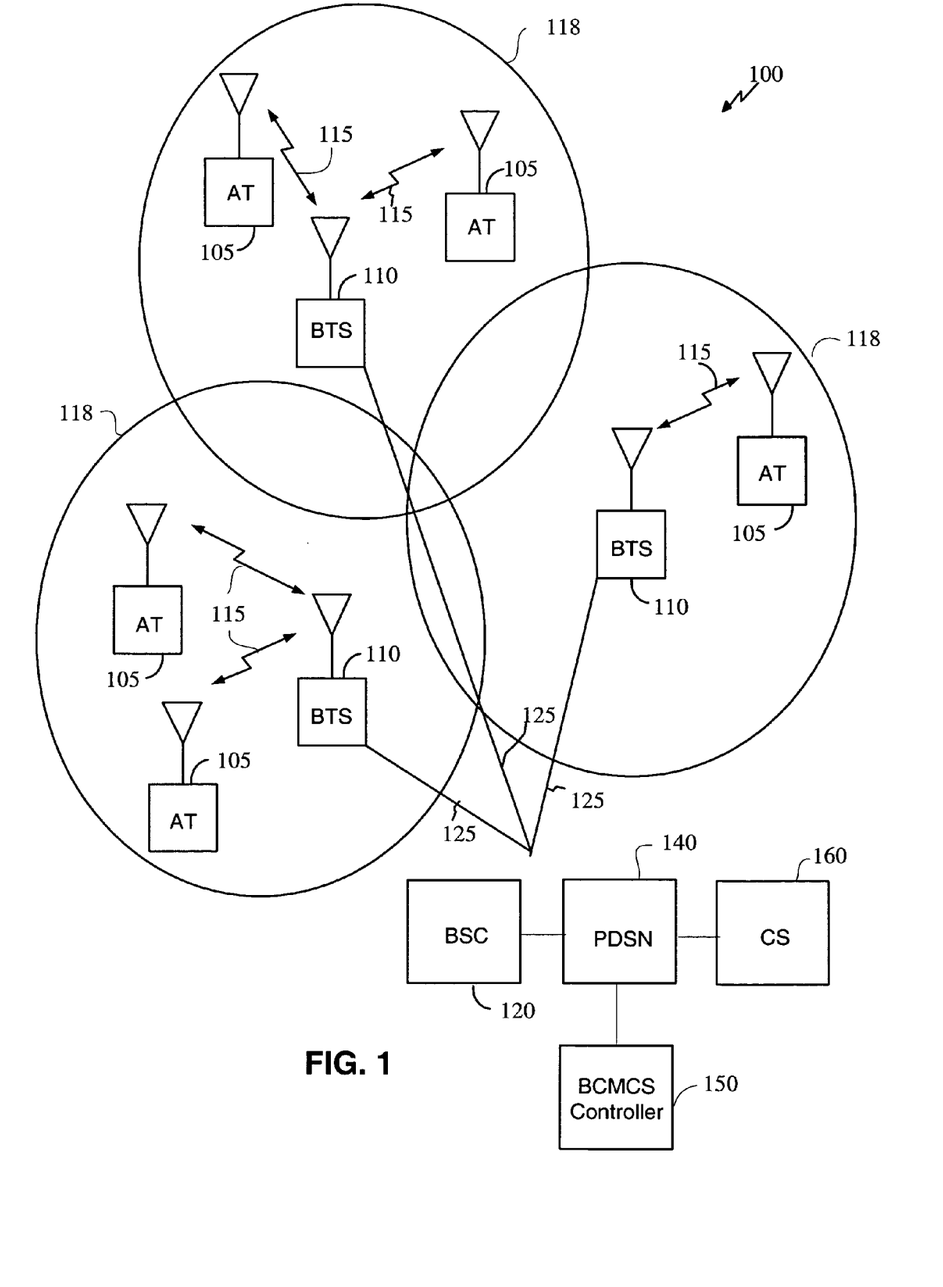
FIG. 1 is a block diagram of a wireless communication system including a plurality of access terminals and a radio access network (RAN) that employs a Broadcast and Multicast Service (BCMCS) in accordance with one embodiment of the present invention.

Turning now to the drawings, and specifically referring to FIG. 1, a wireless communication system 100 is shown in accordance with one embodiment of the present invention. The wireless communication system 100 comprises a plurality of access terminals (AT) 105 that communicate with a plurality of base transceiver sites (BTS) 110, which are geographically dispersed to provide continuous communication coverage with the access terminals 105 as they traverse the wireless communication system 100. The access terminal 105 may take the form of any device that is capable of receiving information from the base transceiver site 110, including a personal digital assistant (PDA), wireless telephone, laptop computer with wireless capability, wireless modem, or any other wireless-capable device.

The wireless communication system 100 employs a Broadcast and Multicast Service (BCMCS) for point-to-multipoint transmission of data packets to a predetermined group of access terminals 105 communicating therein. In one embodiment, the data packets provide content such as, for example, news, movies, sporting events, and the like that is transmitted from the base transceiver sites 110 over a wireless communication link 115 to the access terminals 105. It will be appreciated that the specific type of content transmitted to the access terminals 105 may include a wide array of multi-media data (e.g., text, audio, picture, streaming video, etc.), and, thus, need not necessarily be limited by the aforementioned examples.

Each base transceiver site 110 is coupled to a base station controller (BSC) 120, which controls connections between the base transceiver sites 110 and other components of the wireless communication system 100. The base transceiver sites 110 and the base station controller 120 collectively form a radio access network (RAN) for transporting the content to the plurality of access terminals 105. The base transceiver sites 110 are coupled to the base station controller 120 by communication links 125. In one embodiment, the communication links 125 may take the form of a wireline E1 or T1 link. The communication links 125 may alternatively be embodied using any one of a number of wired or wireless communication mediums including, but not necessarily limited to, microwave, optical fiber, and the like.

The base station controller 120 is coupled to a packet data serving node (PDSN) 140 via a Packet Control Function (PCF) for interfacing the wireless communication system 100 to a content server (CS) 160 via an Internet Protocol (IP) medium (not shown). The PDSN 140 processes the data packets for distribution to the access terminals 105 within the wireless communication system 100 under the control of a BCMCS controller 150, which may or may not have a direct connection to the PDSN 140. For BCMCS service, the base transceiver site 110 receives the stream of information from the PDSN 140 and provides the information on a designated wireless communication link 115 to the predetermined group of access terminals 105 communicating within the wireless communication system 100.

The content server 160 provides the content to be broadcast from the base transceiver sites 110 to the predetermined group of access terminals 105 that are authorized to receive the specific type of content. The base station controller 120 may also be coupled to various other types of networks, such as a public switched telephone network (PSTN), for example, to extend the communication capabilities of the wireless communication system 100. In the illustrated embodiment, the base transceiver sites 110 and the access terminals 105 operate in accordance with a code division multiple access (CDMA) scheme, such as cdma2000, for example. It will be appreciated, however, that the wireless communication system 100 may employ various other multiple access schemes, such as time division multiple access (TDMA) and the like, without departing from the spirit and scope of the present invention.

The wireless communication system 100 enables high speed BCMCS service through the wireless communication link 115 that includes a forward broadcast shared channel (F-BSCH) capable of high data rates that can be received by a large number of access terminals 105. The term forward broadcast shared channel is used herein to mean a single forward link physical channel that carries broadcast traffic. Data may also be transmitted from the access terminals 105 to the base transceiver sites 110 through a reverse link of the wireless communication link 115. In one embodiment, the reverse link may include a signaling traffic channel and a data rate control (DRC) channel. The data rate control (DRC) channel of the reverse link may be used via a data rate request to provide a supportable broadcast data rate that may be used to broadcast the content over the F-BSCH of the forward link.

Typically, a user of the access terminal 105 will receive content from the content server 160 by subscribing to one or more information services over the F-BSCH provided thereby. To authenticate the access terminal 105 for receiving the particular content subscribed to, the BCMCS controller 150 or the content server 160 will generate a value of a Broadcast Access Key (BAK) and provides it over the wireless communication link 115. The BAK serves as a security association between the content server 160 and the group of access terminals 105 that subscribe to certain services provided by the content server 160. The process for providing this authentication for receiving particular content at the access terminal 105 using the BAK is well known to those of ordinary skill in the art. Accordingly, the specifics for this authentication process is not disclosed herein to avoid unnecessarily obscuring the present invention.

Typically, a system operator (of the wireless communication system 100, for example) will charge a user of the access terminal 105 when he or she obtains the BAK for BCMCS content that is provided by the content server 160. If the BAK has a relatively short lifetime (e.g., for a few minutes), the access terminal 105 will typically tune to the BCMCS content on the F-BSCH subsequent to receiving the BAK. In some cases, however, the access terminal 105 may move to a coverage area of the wireless communication system 100 where the radio reception of the access terminal 105 is poor for receiving particular BCMCS content albeit the access terminal 105 may have successfully obtained the BAK over a TCP/IP session. As a result, the access terminal 105 may experience an unacceptable service quality for receiving the content when the access terminal 105 has tuned to the F-BSCH for receiving the BCMCS content.

In another scenario, the lifetime of the BAK may be longer (e.g., for a month or more) to provide the access terminal 105 with particular BCMCS content generated from the content server 160. As long as the BAK is being obtained, the access terminal 105 may receive the particular BCMCS content over the F-BSCH. Although the access terminal 105 may obtain the BCMCS content over the F-BSCH, however, the content may become corrupted when the radio reception for the access terminal 105 is deemed poor. As a result, the access terminal 105 may try to decode the corrupted BCMCS content, thus causing an unnecessary drain on the access terminal 105's battery.

In yet another scenario, the BCMCS content may be delivered to a group of access terminals 105 that may "playback" the BCMCS content at a later time after receiving the content. If an access terminal 105 resides in an area with poor radio reception of the wireless communication system 100, the received BCMCS content may become corrupted when being received over the F-BSCH. The access terminal 105 may subsequently request retransmission of the corrupted BCMCS content at a later time. In such a case, a unicast (i.e., point-to-point) transmission of the content will serve to retransmit the particular BCMCS content that was not properly received by the access terminal 105 initially. However, if the number of access terminals 105 that desire retransmission of the particular BCMCS content becomes large, such unicast transmission may undesirably increase the load of the wireless communication system 100, thereby consuming the system's available resources significantly.

In accordance with one embodiment of the present invention, a service threshold indicator (STI) is employed. The STI indicates to the access terminal 105 whether the BCMCS content that is broadcast from the base transceiver sites 110 may be properly received by the access terminal 105 for successful decoding thereby. That is, the use of the STI reduces the likelihood that the BCMCS content received by the access terminal 105 may be corrupted as a result of the access terminal 105 potentially being located in an area of the wireless communication system 100 that may cause poor radio frequency (RF) reception quality by the access terminal 105. In one embodiment, the STI may be provided in the form of an 8-bit code that represents one or more minimum quality requirements, such as a frame error rate (FER), ratio of the average transmit energy to the total transmit power spectral density ($E_c/I_o$), received signal strength indicator (RSSI), or receive (Rx) power of the access terminal 105 over the wireless communication link 115. In one embodiment, if the minimum quality requirements represented by the STI exceed the quality parameters that are currently experienced by the access terminal 105 over the wireless communication link 115, then the access terminal 105 is prevented from tuning to the F-BSCH because the likelihood of receiving corrupted BCMCS content is increased as a result of the minimum quality requirements of the STI not being achieved by the access terminal 105.

Figure 2:
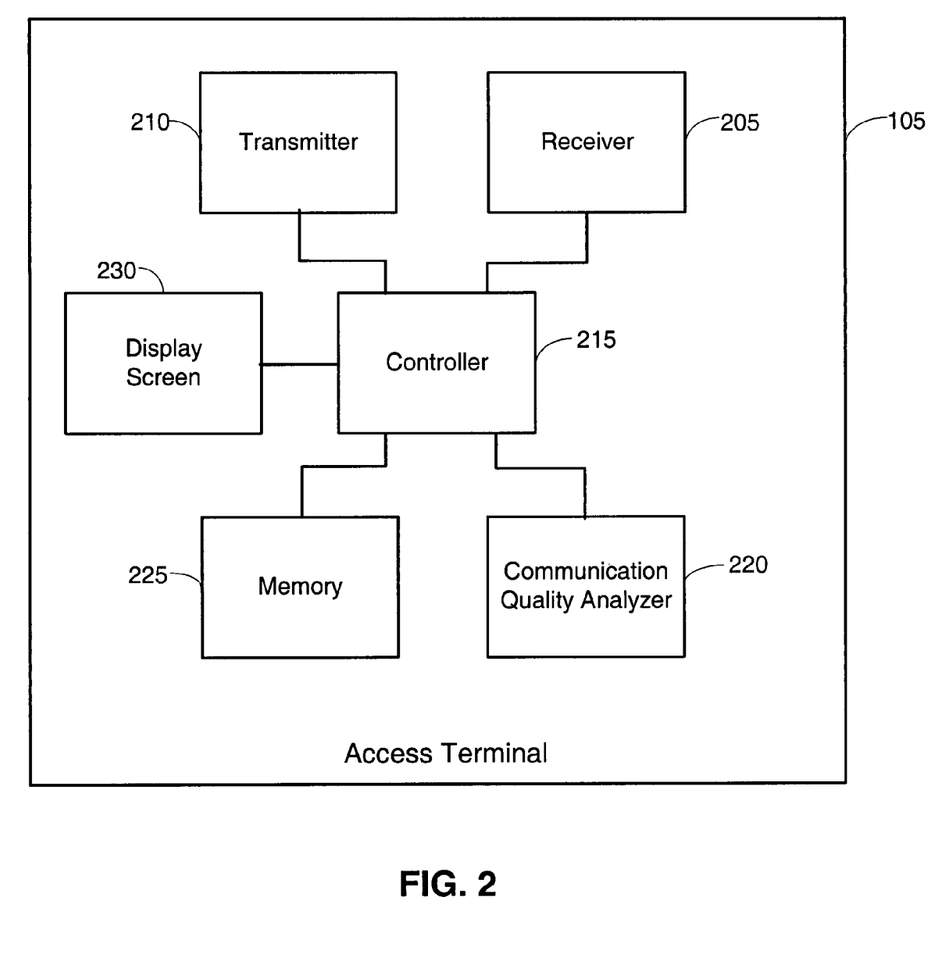
FIG. 2 shows a more detailed representation of each of the plurality of access terminals of the wireless communication system of FIG. 1 in accordance with one embodiment of the present invention.

Referring now to FIG. 2, a block diagram of the access terminal 105 is shown according to one embodiment. In one of its simpler forms, the access terminal 105 comprises a receiver 205 for tuning to the F-BSCH of the wireless communication link 115 and for receiving the BCMCS content transmitted from the base transceiver sites 110. A transmitter 210 may transmit data to the base transceiver site 110 with which the access terminal 105 is communicating. The access terminal 105 also comprises a controller 215 for controlling various operating functions of the terminal 105 and a memory 225 for storing data. The access terminal 105 further comprises a communication quality analyzer 220 for providing a qualitative assessment of communication over the wireless communication link 115 between the access terminal 105 and the base transceiver site 110 with which the access terminal 105 is communicating. In one embodiment, the communication quality analyzer 220 may determine the frame error rate (FER) of communication over the F-BSCH and generates a quality parameter indicative thereof. The communication quality analyzer 220 may further determine the ratio of the average transmit energy to the total transmit power spectral density ($E_c/I_o$), received signal strength indicator (RSSI), or the receive (Rx) power of the access terminal 105 as quality parameters of the wireless communication link 115. It will be appreciated that various other quality parameters may be ascertained by the analyzer 220 to qualitatively assess the communication on the F-BSCH, and, thus, need not necessarily be limited to the aforementioned examples. Additionally, the analyzer 220 may determine any combination (i.e., more than one) of the quality parameters provided above.

In accordance with one embodiment, the quality parameter(s) may be determined automatically by the communication quality analyzer 220 on a periodic basis. That is, the quality analyzer 220 may sample the communication quality of the F-BSCH after the expiration of a predetermined time interval. The analyzer 220 may alternatively determine the communication quality of the F-BSCH upon the occurrence of a predetermined event. In one embodiment, the predetermined event may be receiving a control signal from the radio access network of the wireless communication system 100 to have the analyzer 220 determine the quality of the F-BSCH. In another embodiment, the predetermined event for triggering the analyzer 220 to sample the communication quality may be an explicit action performed by the access terminal's user, such as the user depressing a key (not shown) on the access terminal 105, for example. It will be appreciated that various other events may cause the analyzer 220 to determine the quality of the F-BSCH, and, thus, need not necessarily be limited to the aforementioned examples. The access terminal 105 may further be configured with a display screen 230 to visually indicate to the user whether the access terminal 105 may or may not adequately receive the BCMCS content over the F-BSCH based upon determining the quality parameters by the analyzer 220.

As mentioned, the access terminal 105 illustrated in FIG. 2 is provided in one of its simpler forms. Accordingly, the access terminal 105 may include additional components for providing a variety of other functions without departing from the spirit and scope of the present invention. Additionally, the functionality of the various components within the access terminal 105 may be combined into a single component. For example, the functionality performed by the communication quality analyzer 220 may be performed by the controller 215 as opposed to being performed by a separate component thereof.

Figure 3:
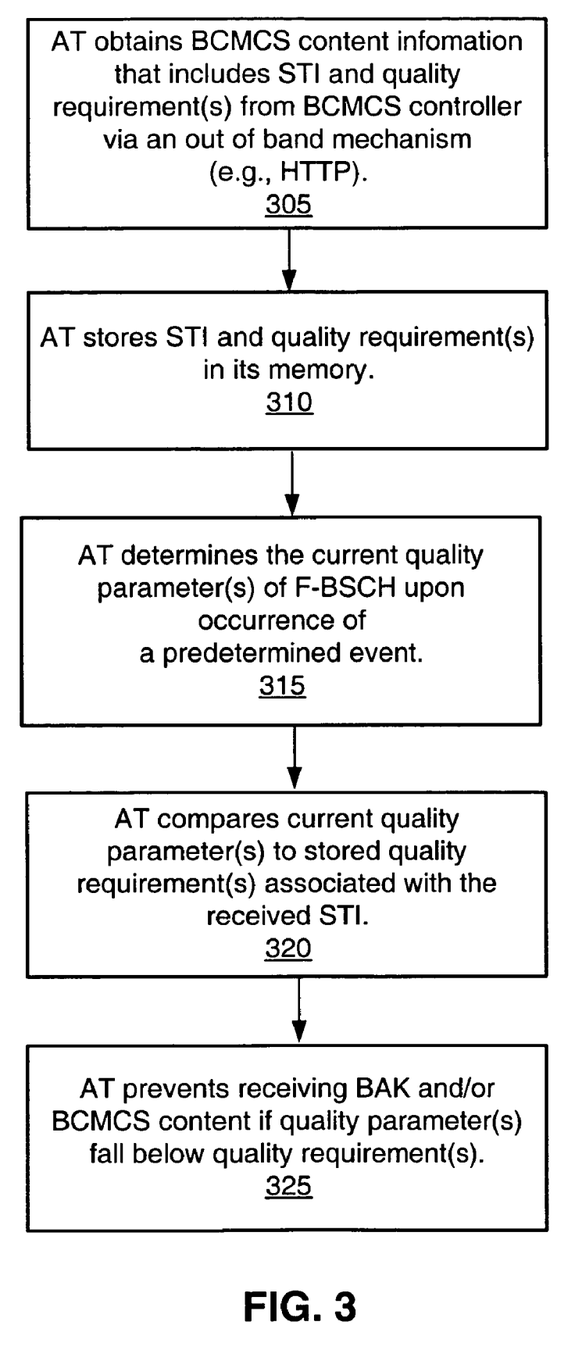
FIG. 3 is a flow chart of a process for obtaining a quality parameter from each of the plurality of access terminals according to one embodiment of the present invention.

Referring now to FIG. 3, a process performed by the access terminal 105 of the wireless communication system 100 is provided in accordance with one embodiment of the present invention. At block 305, the access terminal 105 obtains BCMCS content information such as a BCMCS Flow ID and minimum quality requirement(s) of the F-BSCH designated by the STI from the BCMCS controller 150 via an out of band mechanism, such as a hypertext transfer protocol (HTTP), for example. In response to receiving this information, the access terminal 105 stores the quality requirement(s), which indicate to what degree or magnitude of communication quality the F-BSCH is needed to possess, in the memory 225 along with the STI value at block 310. According to one embodiment, the STI value is 8-bits and indicates an integer value for designating the minimum quality requirement(s) for properly receiving particular BCMCS content over the F-BSCH for successful decoding by the access terminal 105. For example, the quality requirements to decode particular BCMCS content by the access terminal 105 may be to have an FER of less than 1%, an $E_c/I_o$ of greater than −14 dB, and an Rx power of greater than −98 dB. These minimum quality requirements imposed by the system operator of the wireless communication system 100 may be represented by an 8-bit STI value of "0000 0001," for example. Alternatively, the minimum quality requirements may be to have an FER of less than 2% and an $E_c/I_o$ of greater than −12 dB, for example. These latter quality requirements may be represented by an STI value of "0000 0005," for example. It will be appreciated that the STI value need not necessarily be limited to being 8-bits long, but may include fewer or more bits. Additionally, it will be appreciated that the quality requirements may include various other communication quality measurements, and, thus, need not necessarily be limited to the aforementioned examples. Moreover, the STI value may designate one or more minimum quality requirements.

At block 315, the access terminal 105 determines the current quality parameter(s) of the F-BSCH by the communication quality analyzer 220 upon the occurrence of a predetermined event. The predetermined event may be for the analyzer 220 to determine the communication quality of the wireless communication link 115 on a periodic basis. In an alternative embodiment, the predetermined event may be receiving a control signal at the access terminal 105 that was generated from the radio access network of the wireless communication system 100, which instructs the analyzer 220 to determine the communication quality of the F-BSCH. In another embodiment, the user of the access terminal 105 may manually trigger the analyzer 220 to ascertain the current quality parameter(s) by the actuation of a key on the access terminal 105, for example.

Once the communication quality analyzer 220 determines the quality parameter(s) of the F-BSCH, the controller 215 compares the current quality parameter(s) from the analyzer 220 to the stored quality requirement(s) associated with the STI value at block 320. If the controller 215 determines that the quality parameter(s) determined by the analyzer 220 are below the quality requirement(s) as designated by the stored STI, the controller 215 prevents the receiver 205 of the access terminal 105 from tuning to the F-BSCH (and/or receiving the BAK) at block 325.

Figure 4:
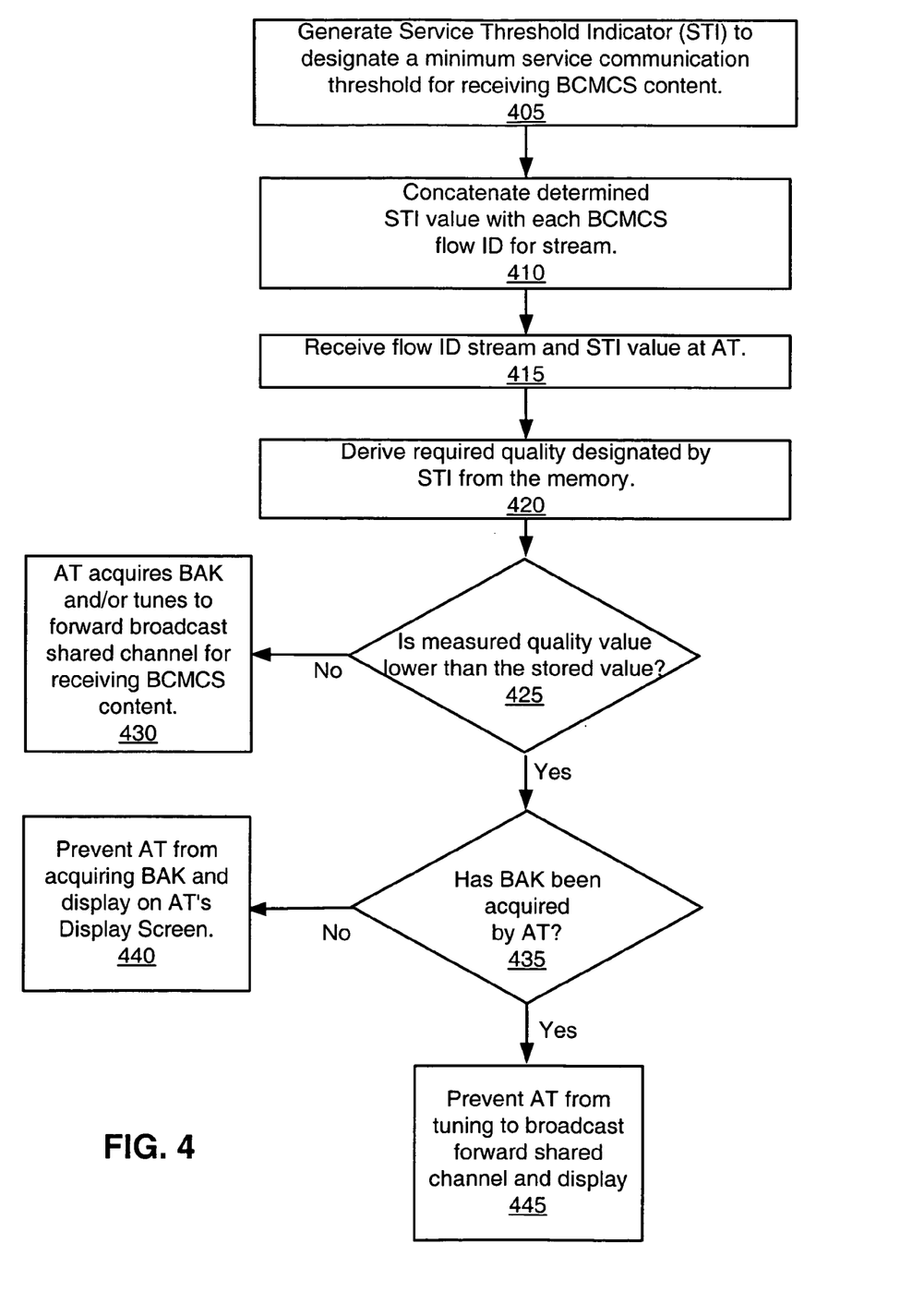
FIG. 4 shows a flowchart for providing a service threshold indicator for a BCMCS service of the wireless communication system of FIG. 1 in accordance with one embodiment of the present invention.

Turning now to FIG. 4, a process for providing a service threshold indication for a Broadcast and Multicast Service (BCMCS) of the wireless communication system 100 is provided in accordance with one illustrative embodiment of the present invention. At block 405, the BCMCS controller 150 generates a service threshold indicator (STI) value to designate a minimum service communication threshold for receiving particular BCMCS content by the access terminal 105 that is transmitted over the F-BSCH by the base transceiver site 110. As mentioned, the quality requirement(s) designated by the STI value may be based on a minimum frame error rate (FER) over the F-BSCH of the wireless communication link 115 between the access terminal 105 and the base transceiver site 110. The quality requirement(s) designated by the STI value may further be based on a ratio of the average transmit energy to the total transmit power spectral density ($E_c/I_o$), received signal strength indicator (RSSI), or the receive (Rx) power of the access terminal 105, and the like. It will be appreciated that the quality requirement(s) may be based on a variety of other communication quality factors of the F-BSCH and, thus, need not necessarily be limited to the aforementioned examples.

Figure 5:
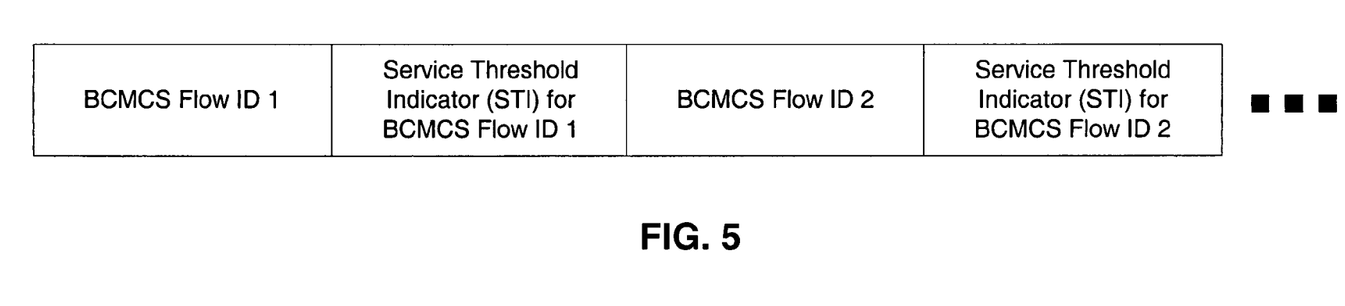
FIG. 5 illustrates a Service Threshold Indicator (STI) embedded in a BCMCS flow ID stream that is transmitted to the access terminals in accordance with one embodiment of the present invention.

At block 410, the BCMCS controller 150 concatenates the STI value determined with each Flow ID of the BCMCS flow ID stream transmitted on the overhead channel between the base transceiver site 110 and the access terminal 105 as illustrated in FIG. 5.

At block 415, the access terminal 105 receives the BCMCS flow ID stream and STI value from the base transceiver site 110 communicating therewith. At block 420, the access terminal 105 obtains the quality requirement(s) using the STI value received with the BCMCS flow ID from the memory 225 of the access terminal 105. At block 425, it is determined if the current (i.e., measured) quality parameter(s) that are determined by the communication quality analyzer 220 are lower than the quality requirement(s) associated with the STI value in the memory 225 of the access terminal 105. If it is determined that the measured quality parameter(s) at the access terminal 105 are not lower than or equal to the quality requirement(s) in the memory 225, then the access terminal 105 acquires the BAK and/or tunes to the corresponding F-BSCH for receiving the BCMCS content at block 430.

If, however, the measured quality parameter(s) are lower than the quality requirement(s) designated by the STI value in the memory 225, the process continues to block 435, where it is determined if the BAK has already been acquired by the access terminal 105. If the BAK has not yet been accessed by the access terminal 105 in block 435, the access terminal 105 is prevented from acquiring the BAK at block 440 and an "out of coverage" indication may be displayed on the display screen 230 of the access terminal 105. If, however, the BAK has been acquired by the access terminal 105 at block 435 (or the BAK is not required for receiving the BCMCS content), the process continues to block 445, where the access terminal 105 prevents tuning to the F-BSCH for receiving the BCMCS content and an "out of coverage" indication may be displayed on the display screen 230 of the access terminal 105.

In accordance with another embodiment, the quality requirement(s) may be transmitted to the access terminal 105 directly on an overhead channel as opposed to transmitting the STI value. These quality requirement(s) may be transmitted directly over the F-BSCH concatenated with the BCMCS Flow ID. Although transmitting the quality requirement(s) directly over the F-BSCH may consume more air-interface between the access terminal 105 and the base transceiver site 110, the access terminal 105 need not perform a conversion between the STI value and the stored quality requirement(s).

Figure 6:
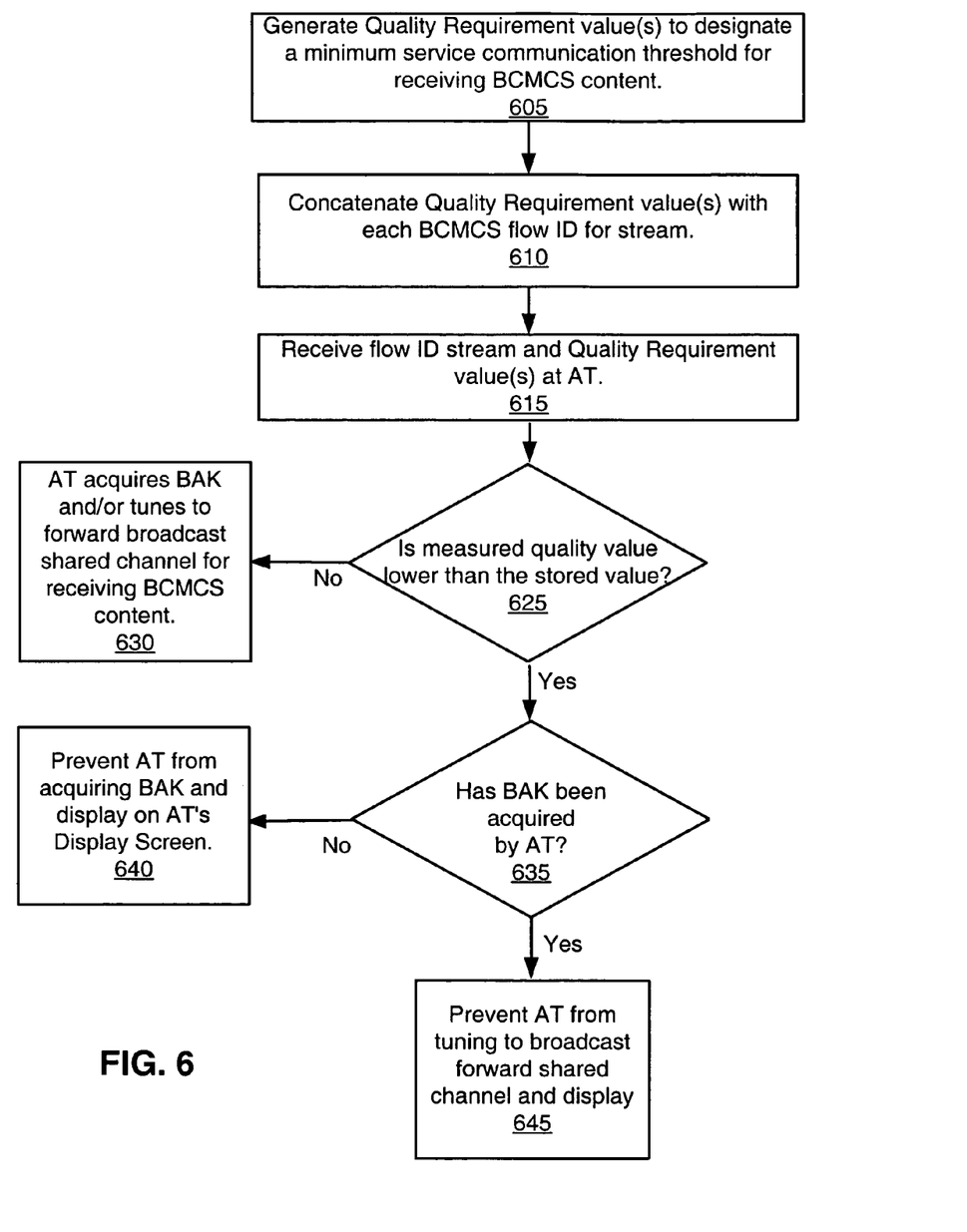
FIG. 6 shows a flowchart for providing a quality requirement for BCMCS service of the wireless communication system of FIG. 1 in accordance with one embodiment of the present invention.

Turning now to FIG. 6, a process for providing quality requirement(s) for a Broadcast and Multicast Service (BCMCS) of the wireless communication system 100 is provided in accordance with one illustrative embodiment of the present invention. At block 605, the BCMCS controller 150 generates quality requirement(s) to designate a minimum service communication threshold for receiving particular BCMCS content by the access terminal 105 that is transmitted over the F-BSCH by the base transceiver site 110. In one embodiment, the quality requirement(s) may be based on a minimum frame error rate (FER) over the F-BSCH. The quality requirement(s) may further be based on a ratio of the average transmit energy to the total transmit power spectral density ($E_c/I_o$), received signal strength indicator (RSSI), or the receive (Rx) power of the access terminal 105, and the like. It will be appreciated that the quality requirement(s) may be based on a variety of other communication quality factors of the F-BSCH and, thus, need not necessarily be limited to the aforementioned examples.

At block 610, the BCMCS controller 150 concatenates the quality requirement(s) determined with each Flow ID of the BCMCS flow ID stream transmitted on the overhead channel between the base transceiver site 110 and the access terminal 105.

At block 615, the access terminal 105 receives the BCMCS flow ID stream and quality requirement(s) from the base transceiver site 110 communicating therewith. At block 625, it is determined if the current (i.e., measured) quality parameter(s) that are determined by the communication quality analyzer 220 are lower than the quality requirement(s) that were received over the F-BSCH. If it is determined that the measured quality parameter(s) at the access terminal 105 are not lower than or equal to the received quality requirement(s), then the access terminal 105 acquires the BAK for receiving the BCMCS content over the F-BSCH at block 630.

If, however, the measured quality parameter(s) are lower than the received quality requirement(s), the process continues to block 635, where it is determined if the BAK has already been acquired by the access terminal 105. If the BAK has not yet been accessed by the access terminal 105 in block 635, the access terminal 105 is prevented from acquiring the BAK at block 640 and an "out of coverage" indication may be displayed on the display screen 230 of the access terminal 105. If, however, the BAK has been acquired by the access terminal 105 at block 635 (or the BAK is not required for receiving the BCMCS content), the process continues to block 645, where the access terminal 105 prevents receiving the BCMCS content over the F-BSCH and an "out of coverage" indication may be displayed on the display screen 230 of the access terminal 105.

In another embodiment, the quality requirement(s) may be stored in the memory 225 of the access terminal 105 and not transmitted over the F-BSCH or designated by the STI (as is the case with the previous embodiments). That is, the quality requirement(s) may be preconfigured at the access terminal 105, or the access terminal may obtain the quality requirements through various means such as over-the-air (OTA) provisioning techniques, and when the access terminal 105 attempts to decode the BCMCS content or acquires the BAK from the network, the controller 215 of the access terminal 105 compares the current quality parameter(s) of the F-BSCH to the preconfigured quality requirement(s) stored within memory 225.

The quality requirement(s) stored within the memory 225 of the access terminal 105 may be modified by the user of the access terminal 105 through the terminal's keypad (not shown), for example. Alternatively the quality requirement(s) stored within the memory 105 may be modified using well known over-the-air (OTA) provisioning techniques.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a wireless communication system, comprising:
   receiving a value for at least one quality requirement defining a minimum quality of communication service threshold for receiving information by at least one terminal over a communication channel;
   determining a value for at least one quality parameter of the communication channel, the value of the quality parameter defining a degree of quality with which information can be received by the at least one terminal over the communication channel; and
   preventing the at least one terminal from tuning to the communication channel if the value of the quality parameter is lower than the value of the quality requirement.

2. The method of claim 1, further comprising:
   associating the value of the at least one quality requirement with a service threshold indicator (STI) value; and
   communicating the STI value to the at least one terminal.

3. The method of claim 2, further comprising:
   retrieving the at least one quality requirement associated with the communicated STI from a memory of the at least one terminal; and
   comparing the value of the quality parameter to the value of the quality requirement retrieved from the memory.

4. The method of claim 1, further comprising:
   assigning a broadcast access key (BAK) to the at least one terminal, wherein the BAK is used to authenticate the at least one terminal for receiving the information over the communication channel;
   determining whether the BAK has been received by the at least one terminal; and
   preventing the at least one terminal from receiving the BAK providing that the BAK has not been received and the value of the quality parameter is lower than the value of the quality requirement.

5. The method of claim 2, further comprising:
   receiving the STI value and the at least one corresponding quality requirement from a controller of the wireless communication system; and
   storing the STI value and the at least one corresponding quality requirement in a memory of the at least one terminal.

6. The method of claim 1, further comprising:
   displaying at the at least one terminal an indicator that the value of the quality parameter is lower than the value of the quality requirement.

7. The method of claim 1, wherein receiving the value of at least one quality requirement is based on receiving at least one of a frame error rate (FER), a ratio of the average transmit energy to the total transmit power spectral density ($E_c/I_o$), and receive (Rx) power.

8. A method for a wireless communication system, comprising:
   communicating a service threshold indicator (STI) value to at least one terminal, the STI value being indicative of at least one quality requirement defining a minimum quality of service threshold for receiving information by the at least one terminal over a communication channel;
   measuring at least one quality parameter of the communication channel, the quality parameter defining a degree of quality in which communication is received by the at least one terminal over the communication channel; and
   preventing the at least one terminal from tuning to the communication channel providing that the quality parameter is lower than the quality requirement.

9. The method of claim 8, further comprising:
   assigning a broadcast access key (BAK) to the at least one terminal, wherein the BAK is used to authenticate the at least one terminal for receiving the information over the communication channel;
   determining whether the BAK has been received by the at least one terminal; and
   preventing the at least one terminal from receiving the BAK providing that the BAK has not been received and the quality parameter is lower than the quality requirement.

10. The method of claim 8, further comprising:
    receiving the STI value and the at least one corresponding quality requirement from a controller of the wireless communication system; and
    storing the STI value and the at least one corresponding quality requirement in a memory of the at least one terminal.

11. The method of claim 8, further comprising:
    displaying at the at least one terminal an indicator that the quality parameter is lower than the quality requirement.

12. The method of claim 8, wherein the at least one quality requirement and at least one quality parameter includes at least one of a frame error rate (FER), a ratio of the average transmit energy to the total transmit power spectral density ($E_c/I_o$), and receive (Rx) power.

13. An apparatus, comprising:
    a receiver for receiving a value for at least one quality requirement defining a minimum quality of communication service threshold for receiving information by at least one terminal over a communication channel; and
    a controller for determining a value for at least one quality parameter of the communication channel, the value of the quality parameter defining a degree of quality with which information can be received by the at least one terminal over the communication channel; and
    wherein the controller compares the value of the quality parameter to the value of the quality requirement and prevents the at least one terminal from tuning to the communication channel if the value of the quality parameter is lower than the value of the quality requirement.

14. The apparatus of claim 13, wherein the value of the at least one quality requirement is associated with a service threshold indicator (STI) value that is received by the receiver.

15. The apparatus of claim 14, wherein the controller retrieves the at least one quality requirement associated with the communicated STI from a memory of the at least one terminal, and compares the value of the quality parameter to the value of the quality requirement retrieved from the memory.

16. The apparatus of claim 13, wherein a broadcast access key (BAK) is assigned to the at least one terminal, the BAK being used to authenticate the at least one terminal for receiving the information over the communication channel; and
    wherein the controller determines whether the BAK has been received by the receiver, and prevents the at least one terminal from receiving the BAK providing that the BAK has not been received and the value of the quality parameter is lower than the value of the quality requirement.

17. The apparatus of claim 14, wherein the receiver receives the STI value and the at least one corresponding quality requirement and stores the STI value and the at least one corresponding quality requirement in a memory of the at least one terminal.

18. The apparatus of claim 13, further comprising:
a display for displaying at the at least one terminal an indicator that the value of the quality parameter is lower than the value of the quality requirement.

19. The apparatus of claim 13, wherein the at least one quality requirement includes at least one of a frame error rate (FER), a ratio of the average transmit energy to the total transmit power spectral density ($E_c/I_o$), and receive (Rx) power.

20. An apparatus, comprising:
a receiver for receiving a service threshold indicator (STI) value, the STI value being indicative of at least one quality requirement defining a minimum quality of service threshold for receiving information over a communication channel;
an analyzer for measuring at least one quality parameter of the communication channel, the quality parameter defining a degree of quality in which communication is received by the receiver over the communication channel; and
a controller for preventing the receiver from tuning to the communication channel providing that the quality parameter is lower than the quality requirement.

21. The apparatus of claim 20, wherein a broadcast access key (BAK) is assigned to the apparatus, the broadcast access key being used to authenticate the apparatus for receiving the information over the communication channel; and
wherein the controller determines whether the BAK has been received by the apparatus and prevents the apparatus from receiving the BAK providing that the BAK has not been received and the quality parameter is lower than the quality requirement.

22. The apparatus of claim 20, wherein the receiver receives the STI value and the at least one corresponding quality requirement, and the controller stores the STI value and the at least one corresponding quality requirement in a memory.

23. The apparatus of claim 20, further comprising:
a display for displaying an indicator that the quality parameter is lower than the quality requirement.

24. The apparatus of claim 20, wherein the at least one quality requirement and at least one quality parameter includes at least one of a frame error rate (FER), a ratio of the average transmit energy to the total transmit power spectral density ($E_c/I_o$), and receive (Rx) power.

25. An apparatus for a wireless communication system, comprising:
means for receiving a value for at least one quality requirement defining a minimum quality of communication service threshold for receiving information by at least one terminal over a communication channel;
means for determining a value for at least one quality parameter of the communication channel, the value of the quality parameter defining a degree of quality with which information can be received by the at least one terminal over the communication channel; and
means for preventing the at least one terminal from tuning to the communication channel if the value of the quality parameter is lower than the value of the quality requirement.

26. The apparatus of claim 25, further comprising:
means for associating the value of the at least one quality requirement with a service threshold indicator (STI) value; and
means for communicating the STI value to the at least one terminal.

27. The method of claim 1, wherein the communication channel comprises a forward broadcast shared channel.

28. A storage medium encoded with executable instructions that cause a processor to execute a method, the method comprising:
receiving a value for at least one quality requirement defining a minimum quality of communication service threshold for receiving information by at least one terminal over a communication channel;
determining a value for at least one quality parameter of the communication channel, the value of the quality parameter defining a degree of quality with which information can be received by the at least one terminal over the communication channel; and
preventing the at least one terminal from tuning to the communication channel if the value of the quality parameter is lower than the value of the quality requirement.

29. The storage medium of claim 28, wherein the method further comprises:
associating the value of the at least one quality requirement with a service threshold indicator (STI) value; and
communicating the STI value to the at least one terminal.

30. The storage medium of claim 29, wherein the method further comprises:
retrieving the at least one quality requirement associated with the communicated STI from a memory of the at least one terminal; and
comparing the value of the quality parameter to the value of the quality requirement retrieved from the memory.

31. The storage medium of claim 28, wherein the method further comprises:
assigning a broadcast access key (BAK) to the at least one terminal, wherein the BAK is used to authenticate the at least one terminal for receiving the information over the communication channel;
determining whether the BAK has been received by the at least one terminal; and
preventing the at least one terminal from receiving the BAK providing that the BAK has not been received and the value of the quality parameter is lower than the value of the quality requirement.

32. The storage medium of claim 29, wherein the method further comprises:
receiving the STI value and the at least one corresponding quality requirement from a controller of the wireless communication system; and
storing the STI value and the at least one corresponding quality requirement in a memory of the at least one terminal.

33. The storage medium of claim 28, wherein the method further comprises:
displaying at the at least one terminal an indicator that the value of the quality parameter is lower than the value of the quality requirement.

34. The storage medium of claim 28, wherein receiving the value of at least one quality requirement is based on receiving at least one of a frame error rate (FER), a ratio of the average transmit energy to the total transmit power spectral density ($E_c/I_o$), and receive (Rx) power.

* * * * *